2 Sheets
Sheet 1

J. Long.

Mower.

No 2660 Reissued Jun. 25 1867.

Witnesses
D B Vence
Philip C. Dieterich

Whitley Fassett & Kelly
assignees of John Long
By their attorney
R D O. Smith

2 Sheets
Sheet 2.
J. Long.
Mower.
No 2660 Reissued Jun. 25, 1867.
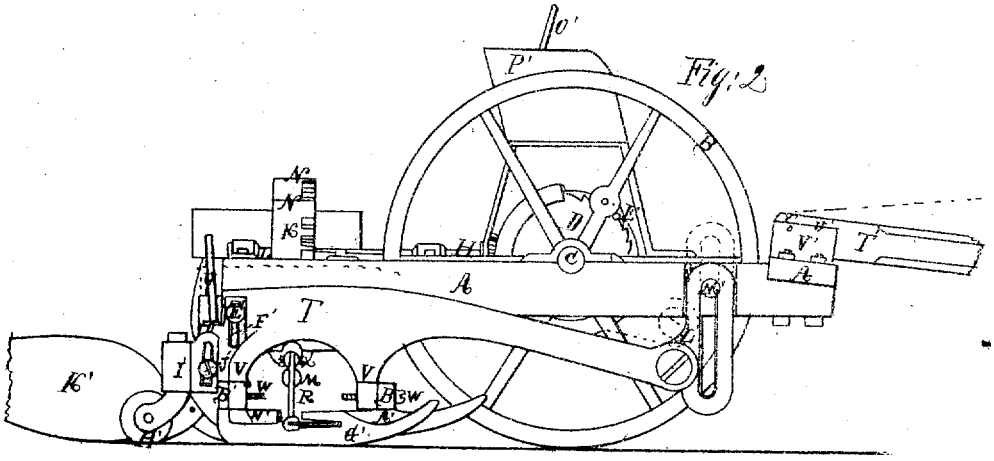
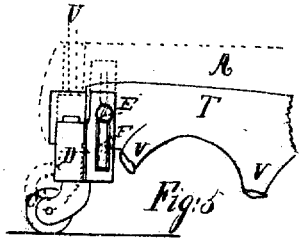
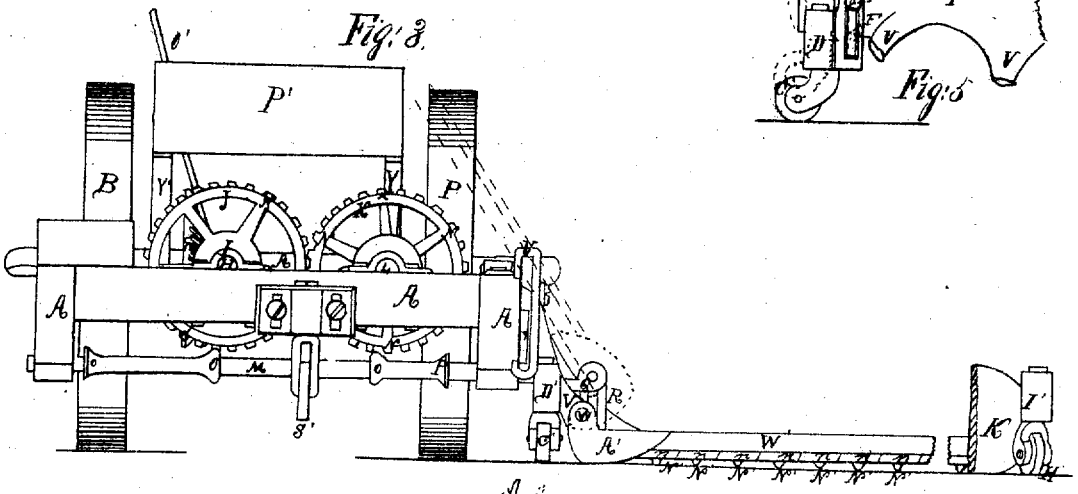
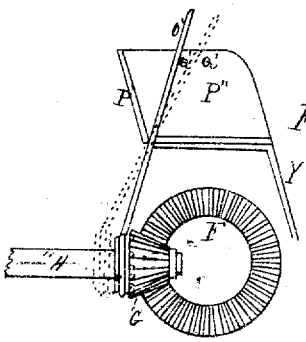
Witnesses
D. B. Newton
Philip C. Dieterich
Whitley Fassler & Tibbey
Assignees of John Long
by their attorney
R. D. Smith

United States Patent Office.

WILLIAM N. WHITELY, JEROME FASSLER, AND O. S. KELLY, OF SPRINGFIELD, OHIO, ASSIGNEES BY MESNE ASSIGNMENTS OF JOHN LONG.

*Letters Patent No.* 18,981, *dated December* 29, 1857; *reissue No.* 2,660, *dated June* 25, 1867.

DIVISION A.

IMPROVEMENT IN HARVESTERS.

The Schedule referred to in these Letters Patent and making part of the same.

TO ALL WHOM IT MAY CONCERN:

Be it known that JOHN LONG, of Massillon, in the county of Stark, and State of Ohio, has invented a new and useful Improvement in Reaping and Mowing Machines; and we do hereby declare the following to be a full, clear, and exact description of the same, reference being had to the accompanying drawings, in which—

Figure 2 is a side elevation of the same.

Figure 3 is a rear elevation of the same.

Figure 4 is a sectional elevation of the driver's seat and the main driving bevel-wheel and pinion.

Figure 5 is an elevation of the rear end of the drag-bar.

Figures 1, 6:
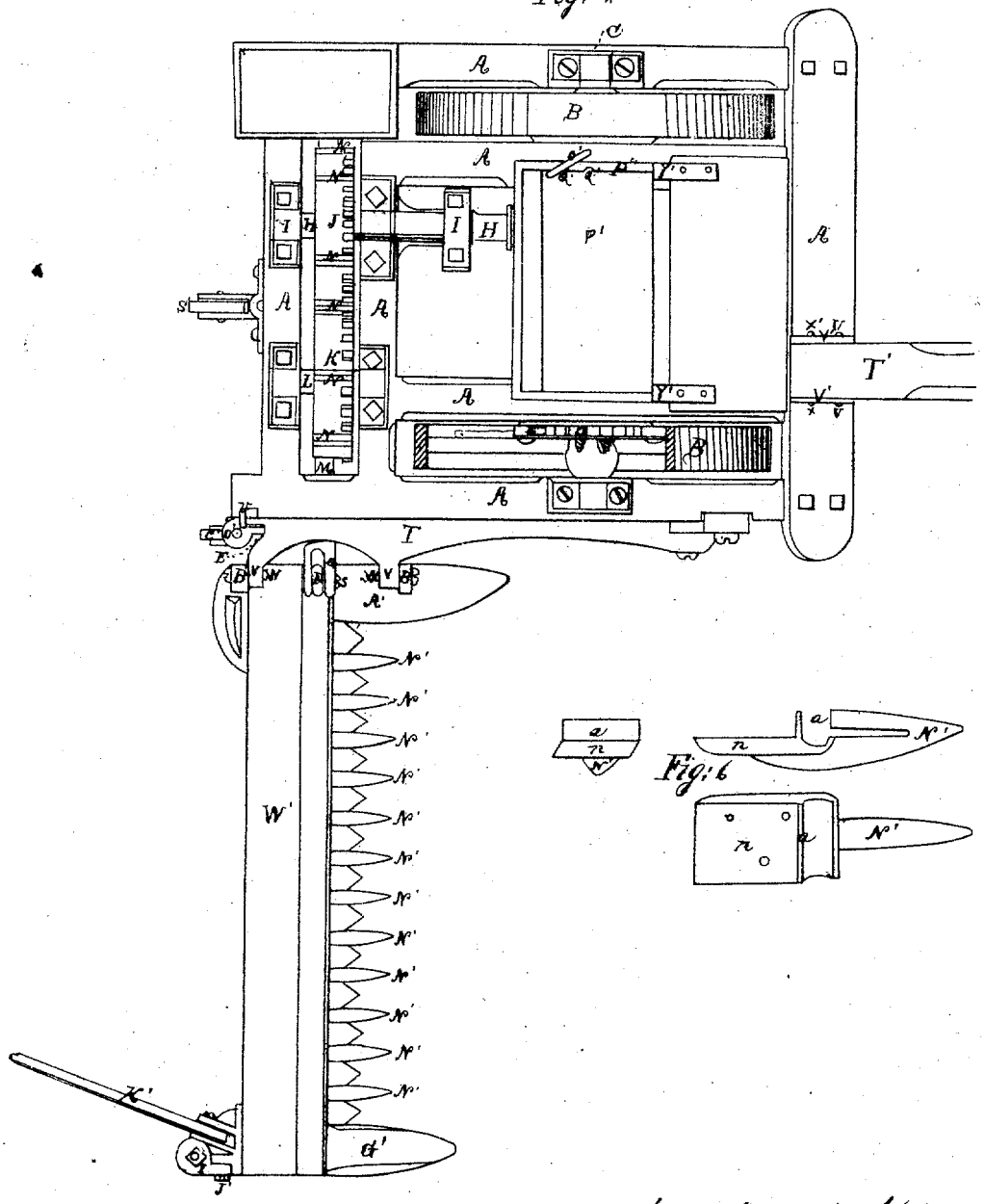
Figure 1 is a plan of this machine.

Figure 6 exhibits the guard-finger in plan, side, and rear elevations.

That part of this invention embraced in this patent consists in the connections of the cutting apparatus to the main frame by hinging the same to a flexible drag-bar, &c.

That others may fully understand its construction and operation we will particularly describe it.

A A A are the timbers which form the main frame, and B B are the supporting and driving-wheels. These wheels are mounted loosely upon the axle C, and are independently geared therewith by means of the ratchet D and pawls E, so that when the machine moves forward either or both of the wheels B may cause the axle C to revolve, and when the machine moves backward either or both of said wheels may revolve freely upon said axle. The bevel gear-wheel F is rigidly secured to the shaft C, and meshes with the cogs of the bevel-pinion G, which is loosely placed upon the end of the cutter's driving-shaft H, but is prevented from revolving independent of said shaft by a spline and feather, which permit said pinion to move freely in the direction of the length of said shaft, to be brought into or thrown out of gear, as desired. The shaft H has its bearings in the boxes I I secured to the main frame. The geared cam-wheel J is mounted upon the shaft H, near its rear end, and meshes with the cogs of the corresponding geared cam-wheel K, which is mounted upon the counter-shaft L, revolving in boxes likewise secured to the main frame and parallel with the shaft H. Directly beneath the cam-wheels J K, and transverse to the main frame, is the sliding connecting-rod M, which is caused to reciprocate by the cam-teeth N upon the cam-wheels J and K, and in its reciprocations to move the cutters of the cutting apparatus to which said connecting-rod is connected. The cam-teeth N are arranged at certain regular intervals upon the peripheries of the cam-wheels, and when said wheels are placed in mesh they are so placed in respect to each other that the cam-teeth on one wheel will exactly alternate with the corresponding teeth on the other wheel. The collars O O, upon the rod M, are so placed in respect to each other and to the wheels J and K as to insure the proper contact with the alternating teeth N, and thereby produce the desired reciprocation. For instance, during the revolutions of the two cam-wheels the proper collar O first engages with one of the teeth N upon the wheel J; by this contact it is moved to the left, and reciprocates the cutter in that direction also. As the cam-tooth N moves in the arc of a circle, and the rod M is tangent thereto, the collar O soon passes beyond the influence of the cam-tooth, and the rod ceases to move; but directly it has ceased to move in one direction, one of the cam-teeth N upon the wheel K engages with the other collar O, and the rod M is returned to the place of starting; the spacings of the cam-teeth N being so arranged that immediately after one wheel is disengaged the other will engage, and the rod M will continue to be reciprocated practically without intermission so long as the wheels J and K continue to revolve. The stops P P limit the extent to which the rod M may be moved, so that a proper engagement cannot be prevented. The collars O extend entirely around the rod M, so that as they become worn by use the rod may be partially rotated on its axis and new surfaces presented. The forked head Q is attached to the end of the rod M by a swivel connection, so that the said rod may be rotated in its bearings, as described, without changing the position of said head. The two branches of the forked head Q enclose between them the slotted standard R, which is erected upon the heel of the cutter-bar, and the said bar and head are connected by a pin or bolt which passes through said slot and into proper orifices in the heads Q. With this method of connecting the cutter and its driving-rod the vertical elevation of the cutting apparatus will make no difference with the position of the stroke of the cutters. T is the drag-bar, by means of which the cutting apparatus is secured to the main frame and drawn forward when the machine is so moved. The drag-bar T is pivoted at its front end at a point further forward than the axis of the bearing and driving-wheels, so that its rear end, to which the cutting apparatus is attached, may rise or fall freely with the undulations of the ground independent of the position or movement of the main frame. The rear end of the drag-bar T is prevented from moving laterally by the slotted plate or link U, which is secured to the main frame, and projects laterally therefrom, so that the rear end of the drag-bar may pass through it. The downward vibrations of the drag-bar will be limited by the lower end of this slot U, and then the weight of the inner end of the cutting apparatus may be supported by the main frame. The rear end of the drag-bar T is provided with projecting lugs, V V, through which pivot-bolts W W are inserted in the same axial line; and by these pivot bolts and lugs said drag-bar is connected with the inner shoe A′ of the cutting apparatus, which is provided with similar lugs B′, through which the pivot-bolts W also pass, thus forming a hinge joint between the cutting apparatus and drag-bar, upon the pivot of which the outer end of the cutting apparatus may rise or fall with the undulations of the ground independent of the inner end, and it also follows that said inner end may correspondingly rise or fall independent of the outer end; and it still further appears that by the union of the vibrating drag-bar T and the hinge joint at W the entire cutting apparatus may rise or fall, independent of the main frame, to conform to the undulations of the ground over which the machine is being drawn.

When mowing, the shoe A′ may be permitted to slide upon the ground, but when reaping it is necessary to elevate it above the ground a short distance, and so maintain it without affecting its capacity to adapt itself to the undulations of the ground. I therefore attach to the rear end of the drag-bar T an adjustable caster-wheel, C′, upon which the rear end of said drag-bar may be carried, and the cutting apparatus may still be free to rise or fall as before. The swivel of the caster-wheel C′ passes through a slotted plate, D′, which is adjustable vertically, and clamped at any point by the screw E′ which passes through the slot F′ and into the drag-bar. Thus the inner shoe A′ may be elevated above the ground as high as may be desired in reaping grain, or only high enough to clear the surface of the ground, and thus avoid the unnecessary friction of a shoe sliding upon the ground. The same requirements apply to the outer shoe G′, and the caster-wheel H′ is therefore attached to said shoe, and made adjustable by means similar to those employed at the inner end of the cutting apparatus, *i. e.*, a slotted plate, I′, and a set-screw, J′, so that the cutting apparatus may be supported at each end, at any desired height above the ground, free to rise or fall with the undulations thereof, and independent of the main frame.

When moving the machine from place to place, the projection of the cutting apparatus sideways is inconvenient, and I therefore construct my machine so that the cutting apparatus may be folded over and supported upon the main frame during transportation, as shown by red lines in fig. 3. While so folded the inner end may still rest upon the caster-wheel C′, though it is altogether preferable to raise said caster-wheel so high that the rear end of the drag-bar T will rest at the bottom of the slot U and be borne by the main frame. At the outer end of the cutting apparatus is a scraping track-clearer, K′, pivoted to the outer shoe so that its rear end drags upon the ground, and rises or falls with the undulations thereof. In position it is oblique to the line of movement, as shown in fig. 1, so that as the machine moves forward that portion of the grass cut by the outer sections of the cutter will be caught by the track-clearer and moved laterally away from the standing grass, so as to leave a clear path for the machine on its next round. The caster-wheel H′ is placed between the track-clearer K′ and the standing grass, and travels in the space cleared by said track-clearer.

It frequently happens that it is desirable to elevate the points of the guard-fingers more than usual, and to this end the forward part of the drag-bar T is pivoted to the slotted plate or slide L′, which is placed in a recess cut in the side of the outer bar A of the frame. The sides of said recess act as guides to prevent any movement of the plate L′, except in a vertical direction, and its vertical movement is limited and controlled by the set-screw M′.

The guard-fingers N′ are constructed as shown in fig. 6. The portion *n* which extends beneath the finger-bar W′, and through which the screws are inserted to bind the finger to said bar, is provided at its front end with a vertical flange, *a*, which rests against the front edge of the finger-bar, and is also constructed with oblique side edges, as shown in figs. 3 and 6, so that each guard-finger shall be supported on one side by the adjoining finger; and I am enabled, by this construction, to secure the guard-finger to the finger-bar with three screws in each instead of four, as might otherwise be necessary.

The clutch-rod O′, by which the bevel-pinion G is thrown into or out of gear, projects for convenience through a hole in the driver's seat P′, and close to one end thereof, as shown in figs. 1 and 3; and I am enabled, by this construction, to bring the end of said rod close to the driver's hand, and to make the stops Q′ Q′ by indenting the side of the arm-board P, so that the pinion G may be thrown into or out of gear, and so retained at the driver's pleasure.

At the rear of the main frame is the caster-wheel S′, which may be adjusted vertically so that it may or may not touch the ground. But when the cutting apparatus is folded upon the main frame for transportation, as shown by red lines in fig. 3, the extra weight upon the rear of the frame would tend to raise the forward end of the tongue in the neck-yoke and annoy the horses, so that at such times it is expedient to loosen the tongue, and permit the rear end of the frame and the weight of the cutting apparatus to be supported by the caster-wheel S′.

The tongue T′ is pivoted to the main frame by the pin X′, which passes through said tongue and through the plates V′, which are bolted to the main frame for that purpose, and it is made rigid or flexible by the presence or absence of the pin U′, which is inserted into the tongue and through the plate V′.

The driver's seat P′ is mounted upon the legs Y′, which are bolted to the frame in front of the seat. No legs or supports are placed under the rear end of the seat, and the elasticity of the legs Y′ permits the seat to yield with the motions of the machine sufficient to make the seat comfortable to the driver.

Having described this invention, what we claim as new, and desire to secure by these Letters Patent, is—

The combination in a machine having two independent driving-wheels of a single drag-bar flexibly connected at its front end with the main frame forward of the axis of the supporting-wheels, its rear end free to rise or fall independent of said main frame, and connected with the main shoe by two joints, one forward of and the other in rear of the sickle, for the purpose of affording the cutting apparatus firm support, and permitting either end of the same to rise or fall with the undulations of the ground over which it is drawn, substantially as described.

Connecting the main shoe of a cutting apparatus, which has reciprocating cutters, with a single drag-bar flexibly connected with the main frame at its front end, and its rear end free to rise and fall with the undulations of the ground, independent of the main frame, by means of projecting joints, one forward of and one in rear of the sickle, so as to leave a clear space between said joints and beneath said drag-bar through which the cutter's connecting-rod may be reciprocated, substantially as described.

The combination of the following instrumentalities in a harvesting machine, viz, two independent driving and supporting-wheels; a main frame, which carries the gearing; a tongue, which may be made rigid or flexible; a single drag-bar, flexibly connected at its front end with the main frame, and its rear end free to rise or fall independent of said main frame; and a cutting apparatus which has reciprocating cutters, and is flexibly connected to the rear end of said drag-bar, so that either end of said cutting apparatus may rise or fall with the undulations of the ground over which it is drawn, substantially as described.

The combination, in a harvesting machine which has two driving and supporting-wheels, and a cutting apparatus which has reciprocating cutters, of a single drag-bar vibrating vertically upon a joint at its front end, and flexibly connected at its rear end with said cutting apparatus, and a vertical slotted retaining link or plate to prevent any lateral movement of the rear end of said drag-bar, and to limit its vibrations downward so as to support the weight of the cutting apparatus when folded upon the machine for transportation, substantially as set forth.

WM. N. WHITELY,
JEROME FASSLER,
O. S. KELLY.

Witnesses:
AMOS WHITELEY,
CLAY WHITELEY.